United States Patent [19]

Speranza et al.

[11] Patent Number: 4,946,933
[45] Date of Patent: Aug. 7, 1990

[54] ELASTOMERIC POLYAMIDE HOT MELT ADHESIVE FROM LOW MOLECULAR WEIGHT POLYOXYETHYLENE DIAMINE

[75] Inventors: George P. Speranza; Wei-Yang Su, both of Austin, Tex.

[73] Assignee: Texaco Chemical Company, White Plains, N.Y.

[21] Appl. No.: 316,200

[22] Filed: Feb. 27, 1989

[51] Int. Cl.$^5$ .............................................. C08G 69/34
[52] U.S. Cl. .................................. 528/339.3; 528/338; 528/339; 528/340; 528/349
[58] Field of Search ..................... 528/339.3, 338, 339, 528/340, 349

[56] References Cited

U.S. PATENT DOCUMENTS 4,062,820 12/1977 Mitchell et al. ................... 528/339.3
4,356,300 10/1982 Isler et al. ......................... 528/339.3
4,740,582 4/1988 Coquard et al. .................. 528/339.3

OTHER PUBLICATIONS

U.S. Pat. No. 3,306,875, Hay, cols. 1-2, 35-36.

*Primary Examiner*—Harold D. Anderson
*Attorney, Agent, or Firm*—Jack H. Park; Kenneth R. Priem; Cynthia L. Kendrick

[57] ABSTRACT

Novel thermoplastic adhesive components prepared from polyoxyethylene diamines, dimer acids and dicarboxylic acids having a wide range of predictable softening points depending upon the molar ratio of the components. Especially interesting products are synthesized employing JEFFAMINE ® EDR-148 and JEFFAMINE ® EDR-192 produced by Texaco Chemical Co. The adhesives can be used as self adhesive materials or as tackifiers for other adhesives.

11 Claims, No Drawings

ELASTOMERIC POLYAMIDE HOT MELT ADHESIVE FROM LOW MOLECULAR WEIGHT POLYOXYETHYLENE DIAMINE

FIELD OF THE INVENTION

This invention relates to polyamide hot melt adhesives. More particularly, this invention relates to the preparation of elastomeric polyamide hot melt adhesives having a predictable wide range of softening points and tensile shear strengths obtained by varying the molar ratio of the components of the reaction mixture. These novel polyamide adhesives are prepared by contacting a polyoxyalkylene diamine, a dimer acid and a short-chain dicarboxylic acid.

The resinous polyamide reaction products of this invention can be used as hot melt adhesives, as the sole material or as tackifiers for other adhesives. They are very elastic and do not snap at break point. At peak stress they start to yield but do not break. In addition, the formulations show a systematic variation in softening point which can now be predicted.

BACKGROUND OF THE INVENTION

Polyamide resins have been the subject of much research since the 1930s. This research has been directed toward improving the processability of polyamide resins.

It is known in the art to copolymerize polyamide forming species and dimer acids or dimer diamines. The trend in the past has been to polymerize substantial amounts of dimer acids with other polyamide-forming species to improve mechanical and rheological properties. See, for example U.S. Pat. No. 4,062,820 and British Pat. No. 1,319,807. In U.S. Pat. No. 3,549,573 there is disclosed such a polymerization employing a dimer acid, a short chain dibasic organic acid and a short chain organic diamine. Undesirable characteristics of the aforementioned adhesives often included insufficient impact resistance or unsuitability as hot melt adhesives due to excessive melt viscosity. Where polyamides having a limited amount of dimer acids were prepared as low melt viscosity resins they exhibited low impact strength and were excessively crystalline and brittle. See, for example, U.S. Pat. No. 4,018,731.

In U.S. Pat. No. 4,128,525 and related U.S. Pat. Nos. 4,162,931 and 4,182,845, all to Yeakey, there is disclosed a method for preparing thermoplastic adhesives having a broad range of hardness, flexibility and compatibility from synthetic materials comprising polyoxypropylene polyamines, short-chain aliphatic or aromatic dicarboxylic acids, esters or anhydride and piperazine. Here, attention is drawn to the fact that, although vegetable and animal based long-chain dimer or trimer fatty acid materials are conventionally employed in the preparation of polyamide-based thermoplastic adhesives, such sources are not as plentiful as they once were due to increased market demands. Thus, adhesives made using synthetic components would be desirable.

U.S. Pat. No. 4,218,351 describes a copolyamide which is the product of a short chain polyamide-forming species, a polyamide-forming dimer acid and amorphous polyamide forming oligomers having an average molecular weight in the range of 600 to 10,000. These polyamides are tough, flexible and impact resistant and are well suited for use as hot melt adhesives.

In Ger. Offen. 2,814,566 there is disclosed a process for preparing hot-melt adhesives from piperazines and compounds of the formula:

$$H_2NCHMeCH_2(OCHRCH_2)_nOCH_2CHMeNH_2$$

where R=H or Me and having a molecular weight of 200–800 and a mixture of $C_{2-7}$ alkanedioic acid and a $C_{8-14}$ alkanedioic acid.

In a publication titled "Polyamides From JEFFAMINE® Poly(Oxypropylene)Amines-Preparation And Use In Hot Melt Adhesives", Texaco Chemical Co.(1975), there is disclosed the use of polyoxyalkylene diamines such as those sold by Texaco Chemical Co. as JEFFAMINE® D-series products in the synthesis of thermoplastic polyamides to form intermediates. The intermediates are then reacted with standard bisphenol A-based epoxy resins to produce adducts which are useful as hot melt adhesives. It was reported the adhesives so produced performed well in bonding aluminum to aluminum and steel to steel, as well as bonding canvas and vinyl to various substrates.

It would be a substantial advance in the art if hot melt adhesives could be produced which exhibited improvements in properties such as elasticity and tact, as well as exhibiting a wide range of softening points and tensile shear strengths which can be obtained in a predictable fashion by adjusting the ratio of components.

SUMMARY OF THE INVENTION

The present invention is a thermoplastic adhesive, wherein during preparation the ratio of components can be adjusted to obtain a wide range of softening points and tensile shear strengths. The product can be used as a hot melt adhesive, as the sole adhesive material or as a tackifier for other adhesives.

The adhesive is the reaction product of a polyoxyalkylene diamine, a dimer acid and a short-chain dicarboxylic acid. The thermoplastic adhesive compound is prepared by mixing and reacting the diamine, dimer and dicarboxylic acid in a molar ratio of about 0.8:1.0 to about 1.25:1.0 total moles of amines to total moles of acid material.

In another embodiment piperazine can be added in an amount of up to about 20 molar percent, based on the total amount of amine present, at a temperature of 170° C. to 280° C. The reaction time is preferably within the range of about 2 to 10 hours. The improved thermoplastic compounds have a broad range of softening points, from about 40° C. to about 170° C.

DETAILED DESCRIPTION

Polyoxyalkylene amines and procedures for their use in producing thermoplastic adhesives such as those in the instant invention are described in the literature. See, for example, U.S. Pat. No. 4,128,525. Polyoxypropylene polyamines are known to be particularly useful as curing agents for polyepoxide resins as illustrated by U.S. Pat. No. 3,462,393.

We have found in the instant invention that certain polyoxyalkylene diamines, when used in the polyamide reaction product of the present invention, produce hot-melt adhesives which exhibit improvements over formulations made with other polyoxyalkylene amines. The instant adhesives are very elastic and do not snap at break point. At peak stress they start to yield but do not break. Further, the formulations show a systematic variation in softening point which can now be predicted.

The examples demonstrate products having very desirable and predictable properties which are obtained using two polyoxyethylene diamines produced by Texaco Chemical Co., JEFFAMINE® EDR-148 amine and JEFFAMINE®EDR-192 amine which will be further identified below.

It will be apparent to those skilled in the art that many of the suitable polyoxyalkylene polyamines may be available as and used as commercial mixtures of several components. The polyoxyalkylene amines which are particularly useful in this invention are polyethylene glycol diamines. Preferred are amine terminated polyethylene glycols having the formula:

$$H_2N-(CH_2CH_2-O)_n-CH_2CH_2-NH_2$$

where n=2 or 3. This includes triethyleneglycol diamine and tetraethyleneglycol diamine. Commercial products used in the examples of this invention include JEFFAMINE® EDR-148 and JEFFAMINE® EDR-192. These are polyoxyethylene diamines produced by Texaco Chemical Co. under the name JEFFAMINE® EDR series amines. JEFFAMINE® EDR-148 is an amine terminated triethylene glycol having the formula:

$$H_2N-CH_2CH_2-O-CH_2CH_2O-CH_2CH_2-NH_2.$$

JEFFAMINE® EDR-192 is an amine terminated tetraethylene glycol having the formula:

$$H_2N-CH_2CH_2-O-CH_2CH_2-O-CH_2CH_2-O-CH_2CH_2-NH_2$$

The above-described polyethylene glycol diamines are reacted with an aliphatic or aromatic dicarboxylic acid, ester or anhydride having from about 2 to about 36 carbon atoms per molecule.

It is well-known that dicarboxylic acids and related corresponding esters and anhydrides react with amines in substantially the same manner. Therefore, for purposes of brevity, these materials will hereinafter be referred to as dibasic acids. The preferred aliphatic dibasic acids have a divalent, saturated, unsubstituted hydrocarbon group, while the preferred aromatic dibasic acids include an unsubstituted phenylene group.

The short chain dicarboxylic acid has the general formula:

and when incorporated in the polyamide can be represented as:

where R' is an aliphatic, cycloaliphatic or aromatic hydrocarbon radical having from 3 to about 15 carbon atoms. Examples of short chain dicarboxylic acids which have utility in the present invention include, glutaric acid, adipic acid, trimethyladipic acid, pimelic acid, suberic acid, azelaic acid, dodecanedioic acid and sebacic acid, isomers of cyclohexanedicarboxylic, isophthalic acid, terephthalic acid, naphthlene dicarboxylic acid, diphenic acid and anthracene dicarboxylic acids.

The preferred short chain dicarboxylic acid monomers are adipic acid, azelaic acid and sebacic acid. Examples I through V demonstrate the particular effectiveness of adipic acid.

In the present invention the dimer acid which may include carboxy functional dimer acids and derivatives thereof are prepared by thermal polymerization (with or without a catalyst) of saturated, ethylenically unsaturated, or acetylenically unsaturated monocarboxylic acids containing 8–24 carbon atoms with monocarboxylic acids having 16–20 carbon atoms being preferred. Dimer acids are, for the most part, a variety of substituted cyclohexenedicarboxylic acids formed by a Diels-Alder type reaction. Their structure can be simplistically represented as:

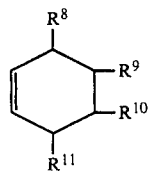

wherein $R^8$, $R^9$, $R^{10}$ and $R^{11}$ are saturated or unsaturated hydrocarbon residues, any two of which contain the functionality required for polyamidification. Examples of possible $R^8$-$R^{11}$ groups include: $-(CH_2)_8COOH$; $-CH=CH(CH_2)_8COOH$; $-CH_2CH=CH-(CH_2)_7-COOH$; $-(CH_2)_8-NH_2-CH=CH-(CH_2)_8NH_2$; $CH_3(CH_2)_4$; $CH_3(CH_2)_4CH-CH$; $-COOH$, $-CH_2NH_2$, etc. Structures other than the above, however, are known to be present in polymerized fat acid mixtures. Such polyamide-forming dimer acids are present in the range of about 5 to 40 mole percent based upon total moles present with about 20 to about 35 mole percent being preferred when incorporated into the present polyamides. The dimer acids have the following structure when incorporated into polyamides such as those of the instant invention:

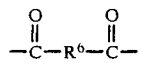

$R^6$ is a dimerized polymeric fat acid residue. In the commercial preparation of polymer fat acids, synthetic or naturally derived $C_{18}$ monocarboxylic acids are generally polymerized.

Preferred polyamide-forming dimeric fat acids for use in the present invention are those containing 36 or more carbon atoms. An example is EMPOL 1010 Dimer Acid from Emery Chemicals.

In an additional embodiment of the invention, piperazine can be added to the thermoplastic adhesive composition. It has been discovered that the employment of piperazine in the preparation of the resinous polyamide reaction product greatly improves adhesive strength, yet other physical characteristics such as flexibility, melting points, hardness and the like are not adversely affected whatsoever. This provides increased flexibility in the employment of thermoplastic adhesives prepared from the above-described polyoxyethylene polyamines and dibasic acids for the production of thermoplastic adhesive formulations which can be tailored with particularly desirable physical properties.

Moreover, we have discovered that the employment of polypropylene polyamines in the preparation of the inventive resinous polyamide reaction product provides a lower adhesive strength and a lower softening point. The polyoxypropylene diamines are of the formula:

wherein x is a integer of from about 2 to about 7. The polyamines are added in an amount of about 0 to about 70 molar percent, preferably about 0 to about 50 molar percent, based upon the total molar amount of amine required for the formulation, set forth hereinabove.

The resinous polyamide reaction product of the present invention is prepared by mixing the above-described ethyleneglycol diamines and and polyoxypropylene diamines with the above-described dimers and dibasic acid at a temperature of between 170° C. and 280° C. The diamines and acid compounds are mixed in a total polyamine:acid molar ratio of from about 0.8:1.0 to about 1.25:1.0.

By adjusting the ratio of components a wide range of softening points can be obtained. Therefore, the preferred molar ratio will depend upon the properties desired in the product.

As stated above, it has been surprisingly discovered in this invention that the ratio of components affects the properties of the product polyamides and that these properties The products of the instant invention exhibit a broad range of softening points. In addition, the tensile shear strengths can be varied over a wide range. From the examples and Table I, it can be observed that where the molar ratio of dimer:adipic acid:polyoxyalkylene diamine is approximately equal, acid to diamine, (for example, Examples 1 and 2) softening points are higher, as well as the peak load and stress points.

The admixture is usually heated for several hours, i.e., from about 2 to 10 hours, at a maximum temperature to complete the reaction, while the by-product, water or alcohol, depending upon the particular compounds employed, is removed. Preferably, the reaction mixture is vacuum stripped by known procedures to develop optimum molecular weight.

The reaction to form the amidoamines may be carried out in the absence of added solvent-diluent, but the latter may be present if desired. By-product water of reaction is preferably removed from the reaction mixture as formed.

The polyoxyalkylene diamine-dibasic acid polyamide polymers formed are random polymers which have a molecular weight less than about 10,000, and normally have a molecular weight ranging from about 2000 to about 10,000.

Where the polyamide is to be formulated with other adhesives and plasticizer, it is necessary that the polyamide be soluble or compatible with such plasticizer components. Examples of compatible plasticizers which may be used with the polyamides here to prepare useful thermoplastic adhesives include toluene sulfonamides, dibutyl phthalates, or short chain polyfunctional polyols. The amount of compatible plasticizer used to prepare the inventive thermoplastic adhesive ranges from about 5 to about 50 wt % based on the weight of the adhesive formulation including the polyamide compound, with about 10 to about 40 wt % being optimum.

The above-described inventive resinous polyamide reaction product can be formulated along with a plasticizer in an amount of about 1 to about 25 wt %, based upon the total formulation weight, of a polyepoxide resin at a temperature above the melting points of each component, e.g., within the range of about 20° C. to about 180° C. The polyepoxide resin component employed is preferably one that is conventionally used in preparing thermoplastic adhesives. Such polyepoxides are well-known complex resinous materials and are generally prepared by the reaction of polyhydric organic compounds with a polyfunctional chlorhydrin. References which describe in detail methods for preparing the epoxide resins of the type concerned here include "Epoxy Resins", by Lee and Neville, McGraw-Hill Book Company, Inc., (1957), and "Epoxy Resins", by Irving Skeist, Reinhold Publishing Company (1958). The particularly preferred polyepoxide resins are the polyglycidyl ethers of polyhydric phenols, such as the diglycidyl ether of resorcinol, the triglycidyl ether of phloroglucinol, the tetraglycidyl ether of tetraphenylolethane or the polyglycidyl ether of a phenolformaldehyde novolac. Especially preferred is the diglycidyl ether of 4,4,-isopropylenediphenol, generally known as bisphenol A, containing a minor amount of cogeneric materials of higher molecular weight and having an epoxide equivalent weight (grams of resin containing 1 equivalent epoxide) of approximately 175 to about 190.

The inventive resinous polyamide reaction compound will normally contain several unreacted amine and carboxylic groups. It is believed that these unreacted groups react with the epoxy group of the subsequently added polyepoxide resin and enhance the tensile strength of the adhesive formulation. Thus, preferably, the resinous polyamide reaction product component will contain a total amine content of about 0.1 to about 2.0 meq/g and will have an acid number of between about 2 to about 20. The total amine content and acid number can be readily controlled during the preparation of the polyamide reaction product as described hereinabove by known procedures and both can be readily determined by well-known analytical procedures.

Compatible fillers can be employed if desired in amounts from 0% up to about 30 wt % without reducing the adhesive properties or other physical characteristics of the inventive compound. In fact, compatible fillers have been found to increase the adhesion bond when the adhesive compounds are applied to certain substrates by reducing thermal expansion, thus reducing strain during curing of the system. Examples of compatible fillers include fumed silica, calcium carbonate, kaolin clays, alumina or titanium oxides, and the like.

In the Examples which represent the method of this invention, the preparation of the novel thermoplastic adhesives is carried out in the following manner. The liquid reactants are added to the reaction vessel first and then the solid dibasic acids added last. If other amines are used along with triethylene and tetraethylene glycol diamines these amines are added first. The contents are heated and then the more active amines of this invention are added.

In the various Examples, the following properties are measured:

Tensile Shear Strength—ASTM D 1002—Strength properties, in psi, of adhesive when loaded to produce shear distortion of planes parallel to the plane of the adhesive bond.

Peak Load—Pounds required to failure

Peak Stress—Pounds per square inch for failure

The examples illustrate the invention in more detail, but are not to be construed as limitative.

EXAMPLE 1

Polyamide From Dimer Acid, Adipic Acid, and EDR-148 (1:1:2 Molar Ratio)

A 500-ml three-necked flask equipped with a thermometer, Dean-Stark trap, stirrer, and nitrogen inlet was charged with dimer acid (168g), adipic acid (43.8g), and JEFFAMINE® EDR-148 (88.8g). The mixture was heated to 220° C.-230° C. for over 5 hours. The water generated was removed through a Dean-Stark trap. The resulting product was a hard-brown solid (softening point 161°–163° C.).

EXAMPLE 2

Polyamide From Dimer Acid, Adipic Acid, and EDR-148 (2:1:3 Molar Ratio)

The procedure of Example 1 was followed except that 224g of dimer acid, 29.2g of adipic acid, and 88.8g of JEFFAMINE® EDR-148 were used. The resulting product was a light-brown gel-like, solid (softening point 118°–119° C.).

EXAMPLE 3

Polyamide From Dimer Acid, Adipic Acid, and EDR-192 (1:1:2 Molar Ratio)

The procedure of Example 1 was followed except that 168g of dimer acid, 43.8g of adipic acid, and 115.2g of JEFFAMINE® EDR-192 were charged. The resulting product was a light-brown gel-like, solid (softening point 105°–107° C.).

EXAMPLE 4

Polyamide From Dimer Acid, Adipic Acid. EDR-148. and D-230 (1:1:1:1 Molar Ratio)

A 500-ml, three-necked flask equipped with a thermometer, Dean-Stark trap, stirrer, and nitrogen inlet was charged with dimer acid (168g), adipic acid (43.8g), and JEFFAMINE® D-230 (69g). The mixture was heated to 170°-180° C. for about 2 hours. To the reaction mixture was added 44.4g of JEFFAMINE® EDR-148 and the whole then heated to 220°-230° C. for 5 hours. The water generated was removed through a Dean-Stark trap. The resulting product was a light-yellow, gel-like solid (softening point 75°-77° C).

EXAMPLE 5

Polyamide From Dimer Acid, Adipic Acid, EDR-192. and D 230 (1:1:1:1 Molar Ratio)

The procedure of Example 4 was followed except that 69g of JEFFAMINE® D-230, 43.8g of adipic acid, 168g of dimer acid, and 57.6g of JEFFAMINE®EDR-192 were used. The resulting product was a light-yellow, gel-like material softening at about 45° C.

Table I shows the wide variation of peak load and peak stress figures which are obtained by varying the molar ratio of the components in the instant invention. It will be noted that: by adjusting the ratio of components a wide range of softening points can be obtained and the tensile shear strengths are varied over a wide range.

TABLE I

TENSILE SHEAR MEASUREMENTS
(Average Of 5 Measurements)

| EXAMPLE | MOLE RATIO OF STARTING MATERIALS | PRAK LOAD Lbs. | PEAK STRES Lbs/Sq. In. |
|---|---|---|---|
| 1 | Dimer Acid, Adipic Acid, EDR-148 (1:1:2) | 311 | 622 |
| 2 | Dimer Acid, Adipic Acid, EDR-148 (2:1:3) | 249 | 498 |
| 3 | Dimer Acid, Adipic Acid, EDR-192 (1:1:2) | 164 | 328 |
| 4 | Dimer Acid, Adipic Acid, EDR-148, D-230 (1:1:1:1) | 58 | 115 |
| 5 | Dimer Acid, Adipic Acid, EDR-192, D-230 (1:1:1:1) | 42 | 85 |

What is claimed is:

1. A process for preparing a polyamide useful as a hot melt adhesive having a wide range of softening points comprising the steps of:
   mixing and reacting
   (1) a polyoxyethylene amine having an average molecular weight of about 148 to about 230 and mixtures thereof;
   (2) a dimer acid having greater than or equal to 36 carbons, and
   (3) a short chain dicarboxylic acid at a temperature of 170°-280° C. for a time period of from about 2 to 10 hours, admixing said polyoxyalkylene amine, dimer and short chain dicarboxylic acid in amounts sufficient to provide a molar ratio of total amine present to acid present of from about 0.8:1.0 to about 1.25:1.0, and recovering the resulting polyamide reaction product.

2. A process in accordance with claim 1 wherein said polyoxyethylene diamine is selected from the group consisting of:

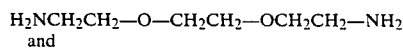
and

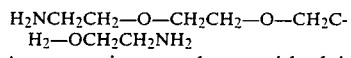

3. A process in accordance with claim 1 wherein said short chain dicarboxylic acid is selected from the group consisting of adipic, sebacic, azelaic, dodecanedioic acid and glutaric.

4. A process in accordance with claim 1 wherein the dimer acid is selected from the group consisting of C-36 dicarboxylic acids derived from tall oil fatty acids.

5. The process of claim 1 further comprising adding up to about 50 molar percent, based upon the total molar amount of amine, of a polyoxypropylene diamine of the formula:

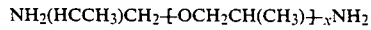

where x is about 2 and having a molecular weight of approximately 230.

6. A resinous polyamide reaction product comprising the polyamide reaction product of:
   a. a diamine from the group consisting of 10 to 50 mole percent polyethylene glycol diamine from the group consisting of triethylene glycol diamine and tetraethylene glycol diamine and 0 to 25 mole percent polyoxypropylene diamine;
   b. 10 to 40 mole percent dimer acid containing 36 or more carbon atoms; and c. 10 to 40 mole percent short-chain dicarboxylic acid selected from the group consisting of adipic, sebacic, dodecanedioic azaleic, glutaric acids and mixtures thereof.

7. A thermoplastic adhesive formulation comprising: a resinous polyamide reaction product having a molecular weight varying from 900 to less than about 10,000 comprising the polyamide reaction product of a polyoxyethylene diamine having an average molecular weight of about 148 to about 230, a dimer acid having 36 or more carbon atoms and a short chained dicarboxylic acid.

8. The formulation of claim 7 wherein said resinous polyamide reaction product is further characterized by its preparation carried out by mixing and reacting said polyoxyethylene diamine, dimer acid and dicarboxylic acid in amounts sufficient to provide a molar ratio of total amine: acid compound in the range of from about 0.8:1.0 to about 1.25:1.0 at a temperature within the range of from about 170° to 280° C.

9. The formulation of claim 7 where in said polyoxyethylene diamine is from the group consisting of an amine terminated triethylene glycol having the formula:

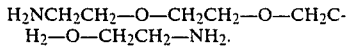

and an amine terminated tetraethylene glycol having the formula:

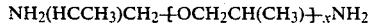

10. The formulation of claim 7 wherein said dicarboxylic acid is selected from the group consisting of adipic, sebacic, azelaic dodecanedioic acid and glutaric.

11. The composition of claim 7 further comprising up to 50 molar percent, based on the total molar amount of amine, of a polyoxypropylene diamine of the formula:

$$NH_2(HCCH_3)CH_2\text{-}[OCH_2CH(CH_3)]_x\text{-}NH_2$$

where x is about 2 and having a molecular weight of approximately 230.

* * * * *